Dec. 19, 1961  A. D. BERK ET AL  3,014,184
FERRITE PARAMETRIC AMPLIFIER
Filed Aug. 18, 1958

INVENTORS.
ARISTID D. BERK,
CONRAD E. NELSON,
LEONARD KLEINMAN,
BY
Robert H. Clay
ATTORNEY

United States Patent Office 3,014,184
Patented Dec. 19, 1961

3,014,184
FERRITE PARAMETRIC AMPLIFIER
Aristid D. Berk, Pacific Palisades, Conrad E. Nelson, Gardena, and Leonard Kleinman, Berkeley, Calif., assignors to Hughes Aircraft Company, Culver City, Calif., a corporation of Delaware
Filed Aug. 18, 1958, Ser. No. 755,597
7 Claims. (Cl. 330—5)

The present invention relates to an amplifier and more particularly to a ferromagnetic microwave amplifier.

With the increased knowledge of the characteristics of ferromagnetic materials, such as ferrites, a number of devices have been developed for more efficient operation at microwave frequencies than the previously used components. Among such devices there has been proposed and developed an amplifier for microwave energy and for details with respect to such amplifier, reference is made to an article by M. T. Weiss, Physical Review, volume 107, 1957, page 317.

Briefly, the referenced amplifier comprises a stripline cavity which is simultaneously resonant to two signal frequencies, with one such signal suitably coupled to the cavity at one end. A high power signal having a frequency equal to the sum of the other two signals and referred to as a "pump" is also applied to excite the cavity. A ferrite element is disposed in the cavity and a static magnetic field applied thereto to establish gyromagnetic resonance preferably at the sum, or pump, frequency. The excitation of the cavity and the direction of the static magnetic field are correlated to provide a component of magnetic field of the pump signal perpendicular to the static magnetic field and a component of the magnetic field of one of the two signals along the direction of the static magnetic field. Under such conditions amplification of the signal is obtained by adjustment of the power of the pump signal to a value which is below that resulting in oscillation of the system.

With respect to such an amplifier, as described in the preceding paragraph, it is to be noted that the static magnetic field has a value establishing gyromagnetic resonance preferably at the frequency of the sum, or pump, frequency. Since the power level at such frequency is high, resonance absorption of energy in the ferrite is high, resulting in a substantially high temperature of the ferrite, which, in turn, effects the magnetization thereof. Thus, for proper operation, suitable field control or temperature compensation is required. Also, as the frequency of the electromagnetic energy increases, the value of static magnetic field for gyromagnetic resonance of the ferrite increases and this relationship establishes the fact that substantially stronger magnetic fields are required as the value of the frequency is increased. Additionally, since there is a practical limit with respect to the magnetic field which can be reasonably established for such an amplifier in the environment in which it is to be used, the value of the pump frequency is limited.

The present invention, in brief, comprises a resonant cavity, such as a simple cylindrical or rectangular cavity, with an axially disposed ferrite element suitably mounted therein. The cavity is excited in a mode having a component of magnetic field perpendicular to a static magnetic field established longitudinally through the ferrite element. The energy providing such mode of excitation is of a high frequency and high value of power to provide the pump signal for the amplifier. The signal to be amplified is electromagnetically coupled to the cavity in a manner such that a component of magnetic field of the resulting excitation is along the direction of the static magnetic field.

In accordance with the invention, the cavity is dimensioned to be resonant at the frequency of the signal, and for efficiency to the frequency of the pump signal. Also the value of static magnetic field for amplification is established for gyromagnetic resonance at a substantially low value, which is proportional to the difference between the pump and signal frequencies, thereby decreasing temperature effects on the ferrite and permitting operation at a higher pump frequency for a given value of static magnetic field.

Another object is to provide a microwave amplifier of simple construction having a ferrite element magnetized by a field proportional to the difference between the pump and signal frequencies.

Still another object is to provide a ferrite amplifier for microwave energy wherein energy at a pump frequency has a magnetic field component perpendicular to the static magnetic field of the ferrite, the signal to be amplified has a component of magnetic field in the direction of the static magnetic field, and the static magnetic field has a value proportional to the difference between the pump and signal frequencies.

A still further object is to provide a traveling wave type amplifier wherein a ferrite loaded rectangular waveguide propagates modes of two different frequencies which are coupled by the ferrite for amplification.

Other objects and advantages of the invention will be apparent from the following description and claims considered together with the accompanying drawing in which:

Figure 1:
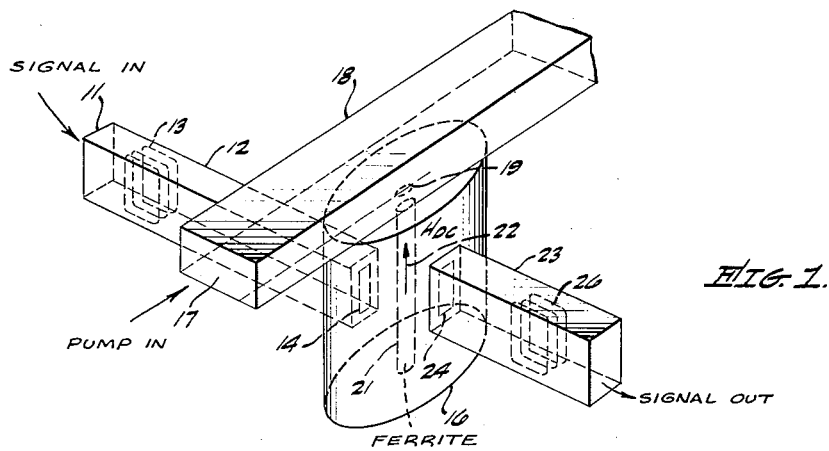
FIGURE 1 is a perspective view of an amplifier in accordance with the present invention.

Referring to FIGURE 1 in detail, there is shown an amplifier for microwave energy as applied to input port 11 of rectangular waveguide 12 from a source (not shown). Such energy is propagated in a plane polarized mode, as indicated by magnetic field lines 13, to side wall coupling aperture or slot 14 of a simple cylindrical resonant cavity 16 to which the waveguide is perpendicularly extended and suitably terminated. Waveguide 12 is disposed with the broad walls parallel to the longitudinal axis of cavity 16 and parallel to the elongated sides of coupling 14. Thus, the magnetic field 13 of energy propagated through waveguide 12 is linearly polarized at the coupling slot 14 and results in excitation of cavity 16 in a mode having a component of magnetic field along the longitudinal axis of the cavity.

Preferably, cavity 16 is resonant at the substantially low frequency $f_s$ of the microwave energy propagated by waveguide 12. While cavity 16 has been described above and illustrated in the drawing as having a cylindrical configuration, it will be readily apparent that other configurations may be used such as square with the only requisite being that the cavity support a mode of excitation similar to that set forth in the preceding paragraph. In accordance with the present invention, a source (not shown) of microwave energy having a substantially high value of frequency $f_p$ and power is suitably coupled to input port 17 of a second rectangular waveguide 18 having broad walls parallel to one end of cavity 16 with one broad wall against such cavity end. For electromagnetic coupling between waveguide 18 and cavity 16, a coupling aperture 19 extends centrally through the end of the cavity and through the adjacent broad wall of the waveguide substantially half of the distance between one narrow wall and the longitudinal center line thereof. Thus, with the microwave energy propagated through waveguide 18 in a plane polarized mode, cavity 16 is excited by electromagnetic coupling of aperture 19 to a point of circular polarization of the waveguide energy. For the most efficient operation cavity 16 is also resonant at the high frequency $f_p$; however, this is not an absolute requirement for operation. Also, to prevent instability during operation it is necessary to prevent buildup of modes at the sum $(f_s+f_p)$ and difference frequencies $(f_p-f_s)$ and this may be readily accomplished by selection of a cavity that is not resonant at these frequencies.

To provide coupling between the two modes and a transfer of power from the high frequency $f_p$ mode to the low frequency $f_s$ mode, the non-linear coupling characteristic of ferrite is utilized. To this end a magnetized ferrite element 21 is suitably mounted in cavity 16 so that a component of magnetic field of the high frequency mode is transverse to the direction of magnetization of the ferrite element and a component of magnetic field of the low frequency mode is along the direction of such magnetization. As illustrated in FIGURE 1, the ferrite element 21 may be a rod extended coaxially along the longitudinal axis of cavity 16, or may be a spheroidal body having a diameter coaxial with the axis of the cavity, with a static magnetic field $H_{DC}$ established through the ferrite element parallel to the axis.

The necessary static magnetic field $H_{DC}$, indicated by arrow 22 for the ferrite element 21 may be readily established in any conventional manner, such as by a magnetic yoke with suitable direct current windings, a solenoid, or a permanent magnet. The actual structure for establishing the static magnetic field has been omitted from the drawing for clarity of illustration. In accordance with the invention, the value of the static magnetic field is established proportional to the difference between the high frequency $f_p$ and the low frequency $f_s$ to provide gyromagnetic resonance at such difference frequency and, for thin cylindrical ferrite rods is determined from the following expression:

$$H_{DC}=(\omega_p-\omega_s)/(\gamma-2\pi M_s)$$

$1/(\gamma-2\pi M_s)$ being the proportionality constant; where $\omega_p$ and $\omega_s$ are the angular frequencies of the two modes, respectively, $\gamma$ is the gyromagnetic ratio of the ferrite, and $M_s$ is the saturation magnetization of the ferrite. For other sizes and shapes of ferrite elements, such expression is altered in minor respects to account for the variation.

Another rectangular waveguide 23 serves as an output of amplified energy at the low frequency $f_s$ and is arranged in a manner similar to that of input waveguide 12 to couple to the linearly polarized component of magnetic field in the cavity at a position 180 degrees from input slot 14 through an output coupling aperture or slot 24. Thus, the broad walls of waveguide 23 are parallel to the longitudinal axis of the cavity 16 and to the longitudinal dimension of coupling slot 24. The output energy is then propagated in a mode having a plane polarized magnetic field 26.

Consider now the operation of the amplifier of FIGURE 1 as described in the foregoing with selected modes of excitation, which are merely illustrative of one manner of providing the necessary magnetic field relationships at the ferrite element 21 for amplification. Thus, the low frequency $f_s$ microwave energy propagated through input waveguide 12 in a plane polarized $TE_{10}$ mode excites a $TE_{011}$ mode in cavity 16 and a component of magnetic field 31, as shown in FIGURE 3, is along the direction of the static magnetic field $H_{DC}$ at the ferrite element 21. Also high frequency $f_p$ and high power microwave energy propagated through waveguide 18 in a plane polarized $TE_{01}$ mode excites a circularly polarized $TM_{121}$ mode in cavity 16 and a component of the magnetic field 36, as shown in FIGURE 2, is transverse to the static magnetic field $H_{DC}$ at the ferrite element 21.

Now with the value of the static magnetic field $H_{DC}$ established proportional to the difference between the frequencies $(f_p-f_s)$ of the two cavity modes in accordance with the expression previously set forth and with the value of power of the high frequency $f_p$ mode established below the critical oscillation value, power from the high frequency mode is coupled to the low frequency mode by the ferrite element 21. Since the high frequency $f_p$ mode supplies power to the low frequency $f_s$ mode, it is referred to as the "pump" and the low frequency $f_s$ mode as the "signal."

The output coupling slot 24 electromagnetically couples to the magnetic field 31 of the signal at a point 180° removed from the input coupling slot 14 of the signal and the amplified signal energy is then propagated through waveguide 23 to a load (not shown) suitably coupled thereto. There has therefore been described, a simple microwave amplifier that may be utilized for amplifying microwave energy with minimum regard to the practical limit imposed by the required value of static magnetic field.

Figure 2:
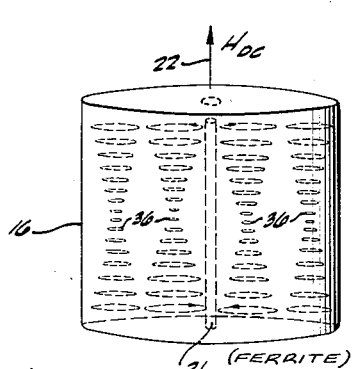
FIGURE 2 is an illustration of the resonant cavity of FIGURE 1 with magnetic field lines of one mode of excitation.
Figure 3:
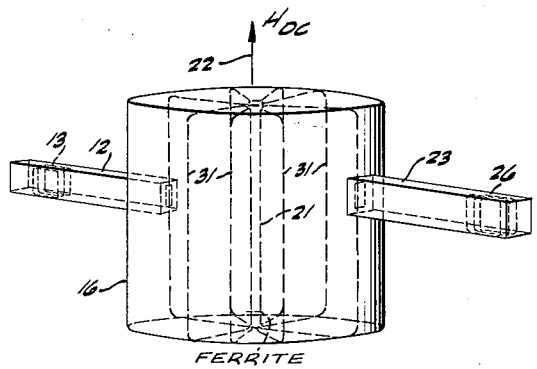
FIGURE 3 is also an illustration of the resonant cavity of FIGURE 1 with magnetic field lines of the second mode of excitation.
Figure 4:
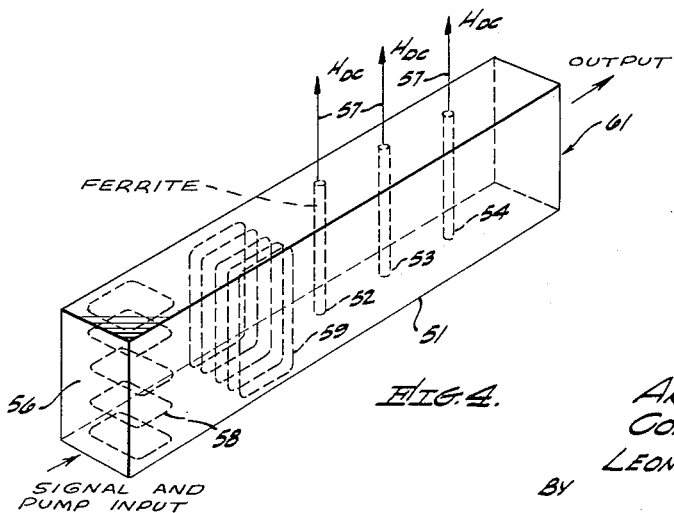
FIGURE 4 is a perspective view of a traveling wave embodiment of the amplifier of FIGURE 1.

A traveling wave embodiment of the amplifier described in the foregoing and illustrated in FIGURES 1 to 3 is shown in FIGURE 4 of the drawing and while the principles of operation are equally applicable, the structure is entirely different. Thus, referring to FIGURE 4 in detail there is shown a section of rectangular waveguide 51 having a plurality of spaced-apart ferrite elements 52, 53, and 54 suitably mounted therein. Each of such ferrite elements 52, 53, and 54 is mounted with its axis parallel to the broad walls of waveguide 51 and extended between the narrow walls substantially half way between one side of the narrow walls and the longitudinal center line thereof.

Two conventional sources (not shown) of microwave energy are suitably coupled to one end 56 of waveguide 51 for propagation of such energies in respective modes so that a component of the magnetic field of one mode having a high frequency $f_p$ and high value of power is transverse to the axis of each of the ferrite elements 52, 53, and 54 and a component of the magnetic field of the other lower frequency $f_s$ mode is along the axis. Now with a suitably established axial static magnetic field $H_{DC}$, indicated by arrows 57, through the respective elements 52, 53, and 54, the required magnetic field relationship for amplification exists.

An example of the modes of excitation to obtain the foregoing required magnetic field relationship is shown in FIGURE 4, where the magnetic field 58 of the high, or pump, frequency $f_p$ mode is a plane polarized $TE_{10}$ mode and that of the lower, or signal, frequency $f_s$ mode is a plane polarized $TE_{01}$ mode. Thus, the ferrite elements 52, 53, and 54 are disposed at points of circular polarization of the magnetic field of the pump wave, though this is not an absolute requirement, and a component is transverse to the axis of each of the ferrite elements. The magnetic field 59 of the signal wave is shown in FIGURE 4 and it is readily apparent that a component exists along the axis of the ferrite elements, 52, 53, and 54. As in the previously described amplifier, the static magnetic field $H_{DC}$ may be established in any conventional manner along the axis of the ferrite elements 52, 53, and 54 and the value of the field is similarly established proportional to the difference $(f_p-f_s)$ between the frequencies of the two modes. While a plurality of ferrite elements 52, 53, and 54 have been set forth and three have been illustrated in FIGURE 4, it will be readily apparent that one, or more than three, are operable depending upon the degree of amplification desired.

The operation of this latter amplifier is the same as set forth for the first described amplifier of the present invention and the amplified signal is available at output port 61 of waveguide 51. The unwanted microwave energy of frequency other than that of the signal at output port 61 may be readily filtered out by any of several known devices or systems and the amplified signal then coupled to a load.

Thus, there have been described two substantially different microwave amplifiers of simple construction, both of which operate under the same principles, and while the salient features have been described in detail with respect to the two embodiments, it will be readily apparent that many modifications may be made within the spirit and scope of the invention and it is, therefore, not desired to limit the invention to the exact details except insofar as they may be set forth in the following claims.

What is claimed is:

1. A microwave amplifier comprising structure for containing modes of microwave energy, a ferrite element mounted within said structure, means for establishing a static magnetic field through said ferrite element, first microwave energy means for establishing a mode of excitation in said structure having a first frequency and high value of power with a magnetic field component transverse to the direction of said static magnetic field, and second microwave energy means for establishing a mode of excitation having a second frequency and a value of power below the critical oscillation value and with a magnetic field component along the direction of said static magnetic field, said first frequency being higher than said second frequency, said static magnetic field having a value equal to a proportionality constant times the difference between the frequencies of said first and second microwave energy means.

2. A microwave amplifier comprising a cylindrical cavity structure resonant at a signal frequency, a cylindrical ferrite rod coaxially mounted in said cavity, a first rectangular waveguide terminated at the sidewall of said cavity and having broadwalls disposed parallel to the axis of said cavity, an input coupling aperture through the cavity wall at the termination of said first waveguide whereby energy propagated through said waveguide excites said cavity in a first mode at said signal frequency, said mode having a component of magnetic field along the axis of said ferrite rod, a second rectangular waveguide mounted with one broad wall contacting one end of said cavity, a coupling aperture communicating centrally through said end of said cavity and through said broad wall of second waveguide substantially half way between the longitudinal center line and side whereby energy having a frequency higher than said signal frequency and a value of power below the critical oscillation value propagated through said second waveguide excites said cavity in a second mode, said second mode having a component of magnetic field transverse to the axis of said ferrite rod, means for establishing a static magnetic field along the axis of said ferrite rod at a value equal to a proportionality constant times the difference between the frequencies of said two modes of excitation in said cavity whereby energy is coupled from said second mode to said first mode by said ferrite rod, and a third rectangular waveguide electromagnetically coupled to said first mode and disposed at a position 180 degrees from said input coupling aperture to remove amplified energy at said signal frequency from said cavity.

3. The combination of claim 2 wherein the value of said static magnetic field is determined by the expression $$H_{DC} = (\omega_p - \omega_s)/(\gamma - 2\pi M_s)$$

where $\omega_p$ and $\omega_s$ are respectively the angular frequencies of said second and first modes of microwave energy, $\gamma$ is the gyromagnetic ratio of said ferrite, and $M_s$ is the saturation magnetization of said ferrite, and wherein $1/(\gamma - 2\pi M_s)$ is said proportionality constant.

4. A microwave amplifier according to claim 3 wherein said cavity is also resonant at the higher frequency of said second mode.

5. A microwave amplifier comprising a rectangular waveguide for propagating first and second space-orthogonal modes of microwave energy, said first mode having a substantially low value of frequency and a component of magnetic field lying along a first plane transverse to the longitudinal axis of said waveguide, said second mode having a higher value of frequency than said first mode and a component of magnetic field lying along a second plane transverse to said waveguide axis and to said first plane, at least one ferrite rod mounted in said waveguide parallel to said second plane, and means establishing a static magnetic field longitudinally through said ferrite rod at a value equal to a proportionality constant times the difference between the frequencies of said two modes, and said second mode having a value of power below the critical oscillation value whereby energy is coupled from said second mode to said first mode by said ferrite rod.

6. A microwave amplifier comprising a rectangular waveguide for propagating first and second space-orthogonal and plane polarized modes, a plurality of spaced-apart and parallel cylindrical ferrite rods mounted transversely between opposing narrow walls of said waveguide, said first mode having a substantially low value of frequency and a magnetic field parallel to the broad walls of said waveguide with a component lying along the longitudinal axis of said ferrite rods, said second mode having a higher value of frequency than said first mode and a magnetic field parallel to the narrow walls of said waveguide with a component transverse to the longitudinal axis of said ferrite rods, and means establishing a static magnetic field longitudinally through said ferrite rods at a value equal to a proportionality constant times the difference between the frequencies of said two modes, and said second mode having a value of power below the critical oscillation value whereby energy is coupled from said second mode to said first mode by said ferrite rods.

7. The combination of claim 6 wherein the value of said static magnetic field is determined by the expression $$H_{DC} = (\omega_p - \omega_s)/(\gamma - 2\pi M_s)$$

where $\omega_p$ and $\omega_s$ are respectively the angular frequencies of said second and first modes of microwave energy, $\gamma$ is the gyromagnetic ratio of said ferrite and $M_s$ is the saturation magnetization of said ferrite, and wherein $1/(\gamma - 2\pi M_s)$ is said proportionality constant.

References Cited in the file of this patent

UNITED STATES PATENTS

| | | |
|---|---|---|
| 2,825,765 | Marie | Mar. 4, 1958 |
| 2,936,369 | Lader | May 10, 1960 |
| 2,962,676 | Marie | Nov. 29, 1960 |

FOREIGN PATENTS

| | | |
|---|---|---|
| 64,770 | France | June 29, 1955 |

(Original No. 1,079,880)

OTHER REFERENCES

Suhl: "Proposal for a Ferromagnetic Amplifier in the Microwave Range," "Physical Review," April 15, 1957, pp. 384–385.

Walker: "Journal of Applied Physics," March 1958, pp. 318–323.

Vartanian et al.: "1957 IRE Wescon Convention Record—Part 1," pp. 52–57.

Landauer: "Journal of Applied Physics," March 1960, pp. 479–484.

Suhl: Journal of Applied Physics, vol. 28, No. 11, November 1957, pp. 1225–1236.

Bloom et al.: RCA Review, vol. 18, December 1957, pp. 578–593.

Tien et al: Proceedings of the IRE, April 1958, pp. 700–706.

Chang et al.: Proceedings of the IRE, vol. 47, No. 7, July 1958, pp. 1383–1396.

Wittke: "RCA Review," December 1957, pp. 441–457 (pages 451 to 457 relied on).